W. E. SHERWOOD.
WHEEL.
APPLICATION FILED NOV. 14, 1916.
1,295,619.
Patented Feb. 25, 1919.
2 SHEETS—SHEET 1.
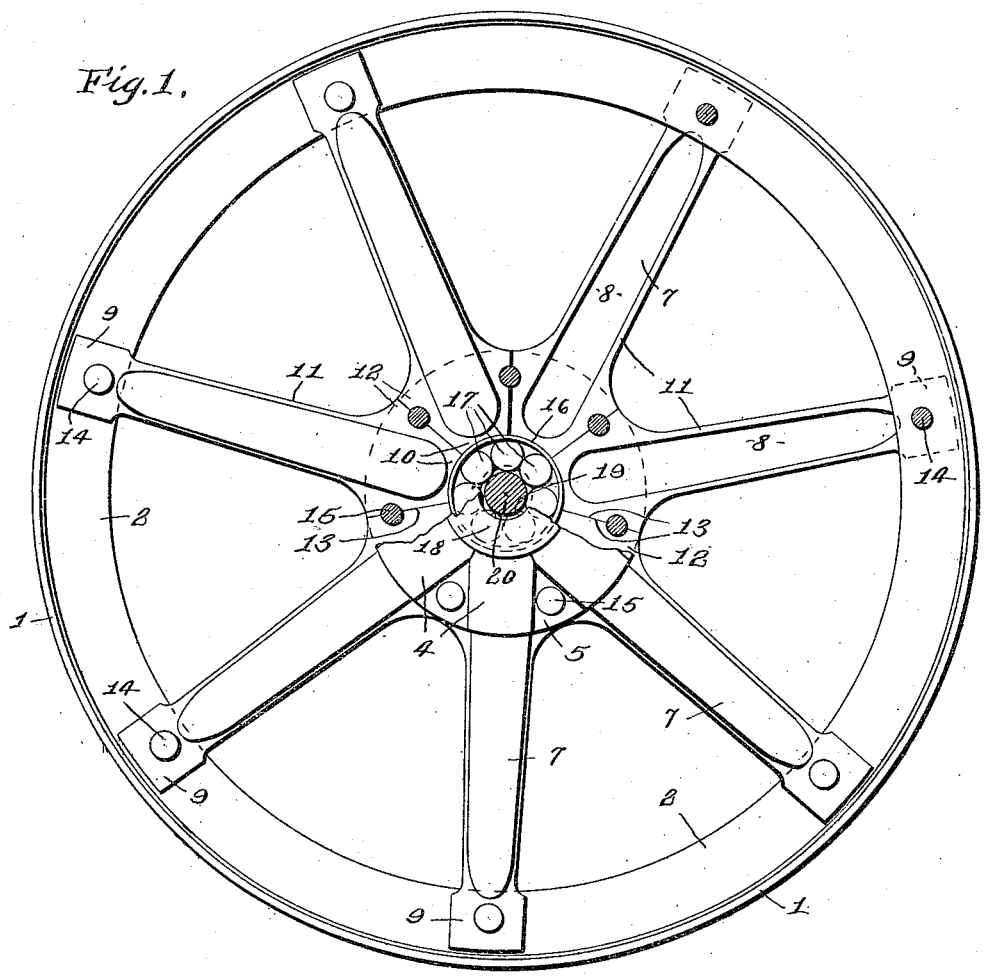
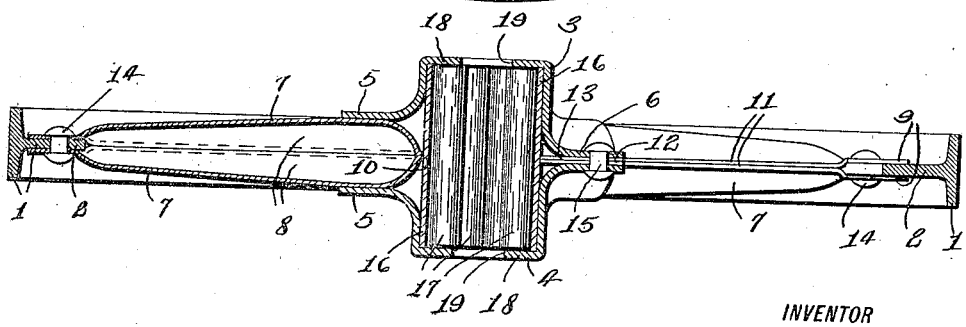
INVENTOR
William E. Sherwood.
BY
Parsons & Bordell.
ATTORNEYS W. E. SHERWOOD.
WHEEL.
APPLICATION FILED NOV. 14, 1916.
1,295,619.
Patented Feb. 25, 1919.
2 SHEETS—SHEET 2.
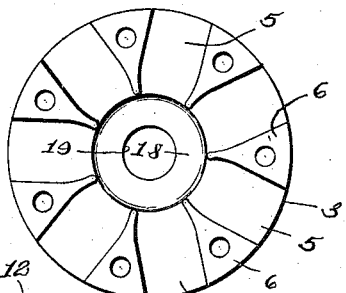
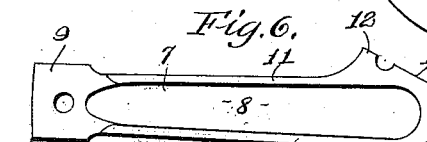
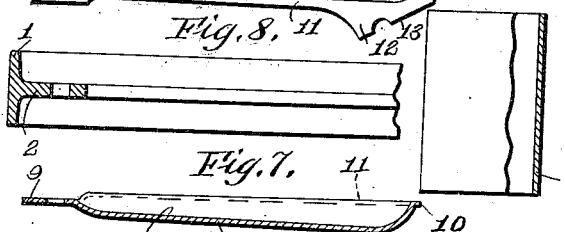
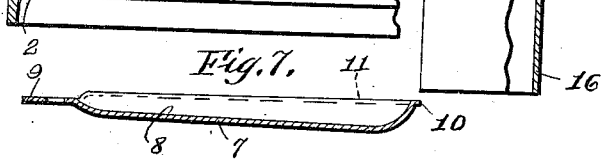
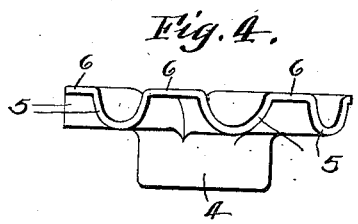
INVENTOR
William E. Sherwood.
BY
Parsons & Birdsell.
ATTORNEYS

# UNITED STATES PATENT OFFICE.

WILLIAM E. SHERWOOD, OF CANASTOTA, NEW YORK.

WHEEL.

1,295,619. Specification of Letters Patent. Patented Feb. 25, 1919.

Application filed November 14, 1916. Serial No. 131,233.

*To all whom it may concern:*

Be it known that I, WILLIAM E. SHERWOOD, a citizen of the United States, and a resident of Canastota, in the county of Madison and State of New York, have invented a certain new and useful Wheel, of which the following is a specification.

This invention has for its object the production of a metal wheel which is particularly simple and strong in construction and highly efficient and durable in use, and which can be produced more economically than the wooden wheels now used; and the invention consists in the novel features and in the combinations and constructions hereinafter set forth and claimed.

Figure 1 is a side elevation, partly broken away, of a wheel embodying my invention.

Fig. 2 is a transverse sectional view thereof.

Figs. 3, 4, 5, 6, 7 and 8 are detail views of parts of the wheel, said parts being shown as slightly displaced from their assembled position, Figs. 3 and 4 being respectively an inner face view and an edge view of the opposing sections of the hub; Fig. 5 a detail view of the bearing sleeve held between the hub sections; Figs. 6 and 7 an inner face view, and a longitudinal sectional view respectively, of the spoke sections; and Fig. 8 being a detail view of the felly.

This wheel is especially adapted for children's carts and coasters, and comprises, generally, a felly, a hub including opposing sections, spokes having their inner ends held between the hub sections and their outer ends secured to the felly.

1 designates the felly which is shown as formed up out of angle iron, and as having an internal annular flange 2. The felly is here shown as T-shape in cross section.

3 and 4 designate the opposing hub sections formed or stamped from sheet metal, each hub having radially extending socket sections 5 and webs 6 between the socket sections. Each hub section is discoidal in general form with its central portion projected in the form of a cup and its marginal portion in the form of an annular flange formed with radial grooves or semicircular corrugations which constitute the spoke socket sections 5.

7 designates the spokes which are composed of opposing duplicate sections stamped from sheet metal, each section being compressed from a flat elongated strip and having a lengthwise corrugation 8 which terminates short of the ends and side edges of the strip leaving flat portions 9 at the outer ends and flanges 10 and 11 at the inner ends and along the sides of the corrugations 8, the flanges extending laterally or widening at 12 on opposite sides of the inner end portions of the corrugation 8.

When the sections of the hub are brought together, the inner ends of the corrugations 8 fit into the spoke sockets 5 and the flanges 10, 12 extend between the webs 6 of the hub sections and abut against each other at their edges at 13. The outer ends 9 of the spoke sections are secured in any suitable manner as by rivets 14 to opposite sides of the flange 2 of the felly. The sections of the hub are held together and clamped upon the inner ends of the spokes by any suitable fastening means as rivets 15 extending transversely through the webs 6 and the meeting margins of the flanges 12, the flanges 12 being provided with notches in their meeting edges through which the rivets 15 extend.

My wheel is also provided with a particularly simple and efficient anti-friction bearing, and, as here shown, a bearing sleeve 16 fits the cup-shaped portions of the hub sections 3, 4 and forms a raceway for anti-friction members as rollers 17, the rollers and sleeve being common to both hub sections and the ends thereof abutting against internal annular flanges 18 at the ends of the hub, which flanges inclose openings 19 for the axle 20.

This wheel is particularly advantageous in that it is composed of a small number of simple parts which are assembled in a particularly simple and economical manner.

What I claim is:

1. A wheel having a hub comprising opposite sections formed with radially extending grooves forming sockets with webs between the sockets, spokes having their inner ends fitting the sockets and provided with flanges extending between the webs, the flanges abutting at their adjacent edges against the flanges of the adjacent spokes, means for clamping the sections together, and a transverse sleeve supporting the inner ends of the spokes and having its ends fitted against the said sections.

2. A wheel having a hub comprising opposite sections formed with radially extending grooves forming sockets with webs between the sockets, spokes having their inner ends fitting the sockets and provided with flanges extending between the webs, the flanges abutting at their adjacent edges against the flanges of the adjacent spokes, means for clamping the sections together, said means extending through the webs and piercing the flanges of the spokes, and a transverse sleeve arranged within the hub and having its ends fitted against the sections thereof, said sleeve having the inner ends of the spokes fitted against it.

3. A wheel having a hub comprising opposite sections formed with radially extending grooves forming sockets with web portions between the sockets, a sleeve arranged between the hub sections and having its ends fitted against the same, spokes grooved longitudinally and having their inner ends fitting in the sockets and provided with flanges extending between the webs, said inner ends of the spokes having converging portions arranged in abutting relation and fitted against the said sleeve, and means for clamping the sections together.

4. A wheel having a hub comprising opposing sections formed with radially extending grooves forming socket sections and with webs between the socket sections, spokes having their inner ends fitting the socket sections and provided with flanges extending between the webs, the flanges abutting at their edges against the flanges of the adjacent spokes, and means for clamping the sections together, said means extending through the webs and through the meeting margins of said flanges, substantially as and for the purpose set forth.

In testimony whereof, I have hereunto signed my name, at Syracuse, in the county of Onondaga, and State of New York, this 6th day of November, 1916.

WILLIAM E. SHERWOOD.

Copies of this patent may be obtained for five cents each, by addressing the "Commissioner of Patents, Washington, D. C."